United States Patent [19]

Yamamoto

[11] Patent Number: 4,655,073

[45] Date of Patent: Apr. 7, 1987

[54] THREAD ROLLING DIE FOR SELF-TAPPING SCREW

[75] Inventor: Hisayoshi Yamamoto, Kawachinagano, Japan

[73] Assignee: Yamahiro Co., Ltd., Osaka, Japan

[21] Appl. No.: 778,966

[22] Filed: Sep. 23, 1985

Related U.S. Application Data

[62] Division of Ser. No. 615,076, May 29, 1984.

[30] Foreign Application Priority Data

Feb. 24, 1984 [JP] Japan ................................ 59-34528

[51] Int. Cl.$^4$ .............................................. B21H 3/06
[52] U.S. Cl. ....................................... 72/469; 10/153
[58] Field of Search ...................... 72/88, 90, 469, 103, 72/104, 108; 10/10 R, 140, 153

[56] References Cited

U.S. PATENT DOCUMENTS

| | | | |
|---|---|---|---|
| 440,329 | 11/1890 | Rogers | 72/469 |
| 1,912,879 | 6/1933 | Arenz | 72/90 |
| 1,946,735 | 2/1934 | Fraver | 72/104 |
| 2,314,391 | 3/1943 | DeVellier | 10/10 R |
| 3,196,654 | 7/1965 | Gordon | 72/88 |
| 3,246,556 | 4/1966 | Phipard, Jr. | 72/88 |

Primary Examiner—Daniel C. Crane
Attorney, Agent, or Firm—Birch, Stewart, Kolasch & Birch

[57] ABSTRACT

A self-tapping screw which is rolled in such a way that a plurality of cutting screw threads performing a cutting function are provided on the top end side of a shank of a screw, whereas the screw thread performing the fastening function is provided on the base end of the shank thereof. A line formed by tracing the boundary between the resistance flank of the cutting screw thread and the shank makes a gradual and more abrupt advance toward the top end direction of the screw in comparison with the line formed by combining the tops of cutting screw threads and relieving is applied to the resistance flank of the cutting thread. The turning torque necessary for cutting the screw is thus smaller. The disclosure is secondly directed to a thread rolling die for making the above self-tapping screw. An angle formed between a line perpendicular to the bottom of a groove shaping the cutting screw thread and a face shaping the resistance flank is provided on the die such that the angle fluctuates along the progressive extension ranging from the begining end of the groove shaping the cutting screw thread to the final end thereof.

18 Claims, 25 Drawing Figures

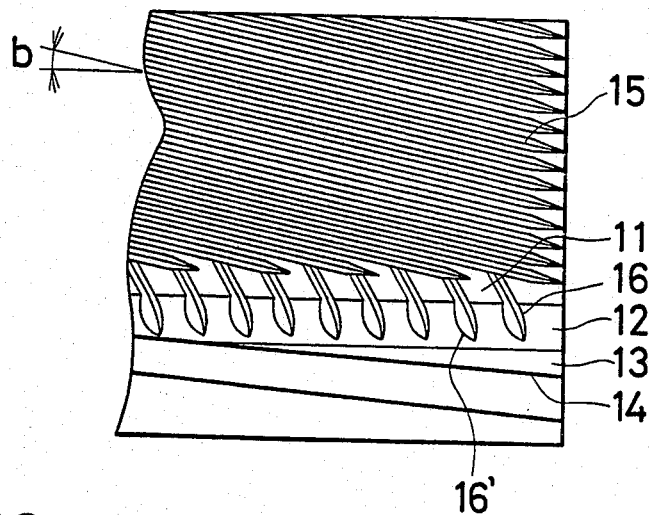
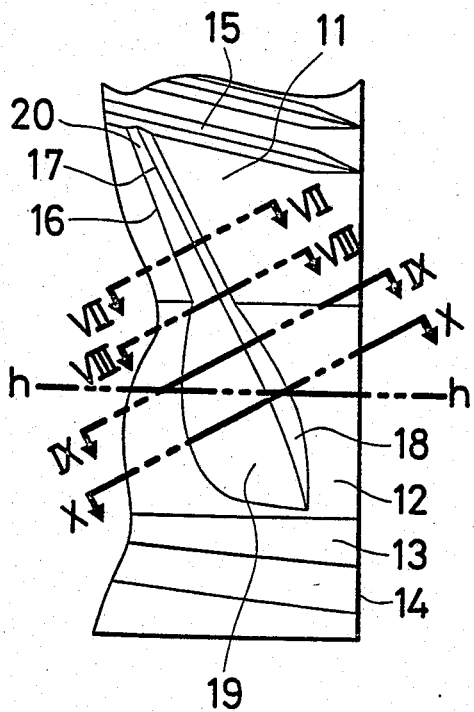
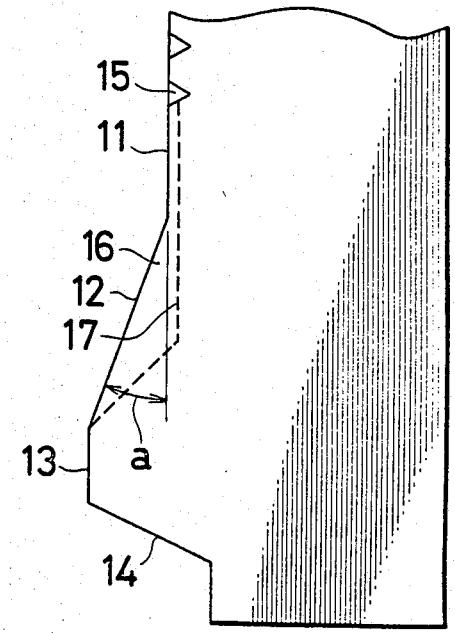

THREAD ROLLING DIE FOR SELF-TAPPING SCREW

This application is a divisional of copending application Ser. No. 615,076, filed on May 29, 1984.

BACKGROUND OF THE INVENTION

The present invention relates to improvements in the self-tapping screw and the thread rolling die used for manufacturing the same more particularly, the present invention is directed to the improvements in the self-tapping screw which is rolled such that a plurality of cutting screw threads performing the cutting function are shaped on the top end of the screw and the thread rolling die for making the same.

Conventionally, this kind of self-tapping screw has been widely used such that a hole is made on a metal plate by means of the cutting section located on the top end of the screw, thereby forming a tapped hole, while fastening the screw itself. In particular, the self-tapping screw with the cutting screw thread rolled on its top end is advantageous in simplification of the machining process in comparison with other kinds of self-tapping screws, because the rolling of fastening screw thread to be provided on the base end of the screw can be performed at the same time as that of the cutting screw thread.

In this connection, various kinds of improvements are submitted, when making this kind of self-tapping screw, in order to attain an advancement in the cutting performance of said screw. It is already well-known that this advancement in the cutting performance requires the cutting screw thread to be extruded to a large extent. Nevertheless, if the cutting screw thread is extremely extruded, it gives rise to a problem disadvantageous in performing so-called relieving of the cutting screw thread.

With regard to such a conventional self-tapping screw as shown in FIG. 1 (Japanese Patent Provisional Publication No. 56-160414), although the external diameter ($h_1$) of the cutting screw threads 1 and 1 is extruded up to being approximately equal to the diameter of the bottom of the thread ($h_2$) of the screw's section proper, if the former diameter is to be measured near the top end of the screw, a problem of wearing the cutting screw thread due to frictional heat is incurred, because, on the cross section perpendicular to the center of shank 2, as shown in FIG. 2, the distance from the center of the shank 2 to the resistance flank 3 becomes equal to that from the center of the shank 2 to the top of the screw thread 4. Thus the resistance flank 3 is placed in frictional contact with the tapped hole made in an article to be cut during the cutting work so that the turning torque is increased.

On the other hand, as shown in FIG. 3, a majority of grooves shaping cutting screw threads 5 are juxtaposed on the lower part of the thread rolling die for making the self-tapping screw. Similarly to the groove shaping the fastening screw thread 6, however, the conventional groove shaping the cutting screw thread 5, which is provided on the above kind of die, has adapted each of the angles formed between the face shaping the resistance flank 7 and the face shaping the cutting flank 8 to be always constant. That is partly because it has been traditionally thought that a series of the screw threads in question might be occasionally changed in their height, but there is no probabiity of changing their angle, and partly because it has been believed that machining the thread rolling die such that both the angles between the face shaping the resistance flank and the face shaping the screw thread and between the face shaping cutting flank and the face shaping the screw thread are gradually changed only with extreme difficulty. Nevertheless, even if the conventional thread rolling die is successful in making the self-tapping screw the screw thread of which is adapted to be extruded to a large extent, as stated above, the problem of facing the inability in advantageously performing the relieving of the screw thread arises.

PURPOSE OF THE INVENTION

In light of the above-mentioned factors, the present invention is concerned with the improvements in the conventional self-tapping screw and the thread rolling die used for making the same.

The major purpose of the present invention is to provide the self-tapping screw in which the resistance flank provided on the cutting screw thread has been favorably relieved and that said resistance flank is not placed in frictional contact with the internal wall of the hole to be cut during the cutting operation so that it is made possible to reduce the turning torque necessary for making the hole.

Another purpose of the present invention is to provide a self-tapping screw in which the development of the frictional heat caused by the frictional contact of the resistance flank with the internal wall of the hole to be cut during the cutting operation is prevented and also it is possible to prevent the cutting screw thread from being worn due to said frictional heat.

Still another purpose of the present invention is to provide and self-tapping screw possessing and cutting screw thread which can sufficiently stand the turning torque incurred in making the hole.

A further purpose of the present invention is to provide a die capable of making the above-mentioned self-tapping screw only by means of a rolling process.

BRIEF DESCRIPTION OF THE DRAWING

Other purposes and many advantages accompanied by them of the present invention may be apparent from the accompanying drawings and the statement as to the drawings.

Broadly speaking, FIGS. 1 to 3 illustrate the conventional examples and FIGS. 4 to 21 illustrate the embodiments of the present invention; namely, FIG. 1 is an enlarged side view illustrating the top end section of a conventional screw, FIG. 2 is an end view taken on the line II—II of FIG. 1, FIG. 3 is an enlarged front view illustrating the lower section of the conventional thread rolling die, FIG. 4 is a front view of the thread rolling die for the self-tapping screw of the first embodiment according to the present invention, FIG. 5 is a partially enlarged view of FIG. 4, FIG. 6 is a partially enlarged side view of said die, FIG. 7 is an end view taken on the line VII—VII of FIG. 5, FIG. 8 is an end view taken on the line VIII—VIII of the same, FIG. 9 is an end view taken on the line IX—IX of the same, FIG. 10 is an end view taken on the line X—X of the same, FIG. 11 is a front view of the self-tapping screw made by the same thread rolling die, FIG. 12 is a partial left side view of the same screw, FIG. 13 is an enlarged side view illustrating mainly the principal section, the top end section, of the screw, FIG. 14 is an enlarged bottom view of the same screw, FIG. 15 is an end view taken on the line XV—XV of FIG. 13, FIG. 16 is an end view taken on the line XVI—XVI of the same, FIG. 17 is an end view taken on the line XVII—XVII of the same, FIG. 18 is an enlarged front view illustrating the top end section of the self-tapping screw of another embodiment, FIG. 19 is an enlarged bottom view of the same screw, FIG. 20 is a partially enlarged front view of the thread rolling die for the same screw, FIG. 21 is a partially enlarged side view of the same die.

DESCRIPTION OF THE PREFERRED EMBODIMENTS

Figure 1:
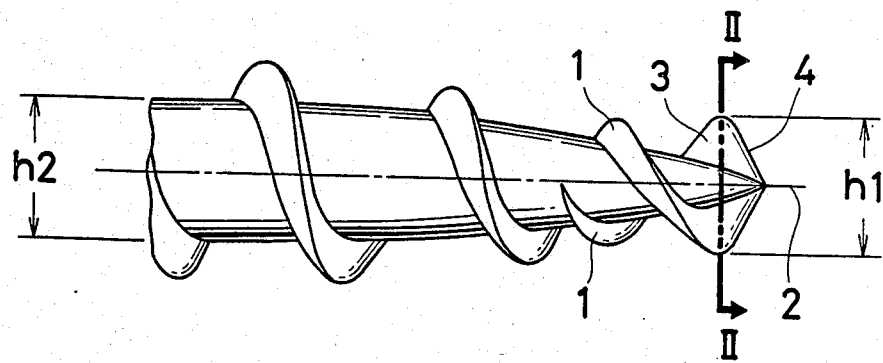
Figure 2:
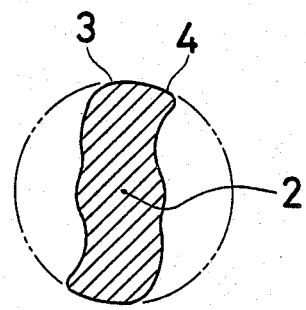
Figure 3:
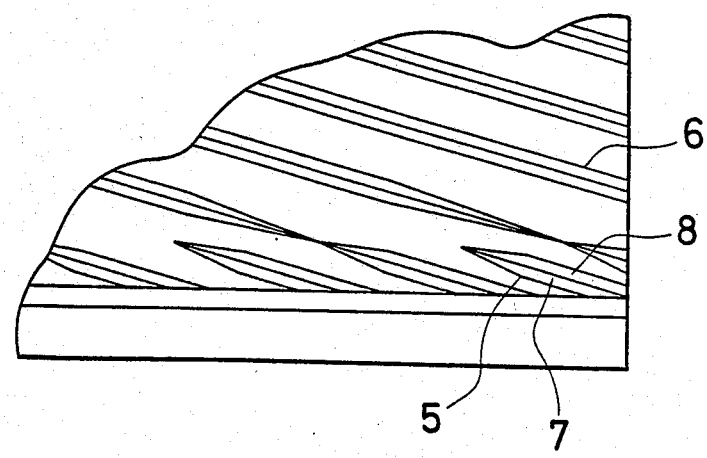
Figure 7:
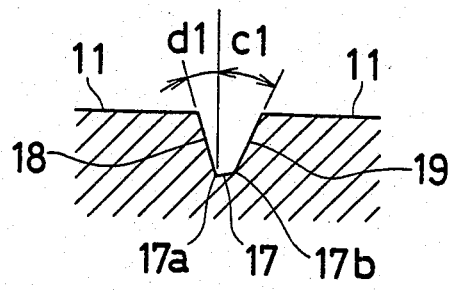
Figure 8:
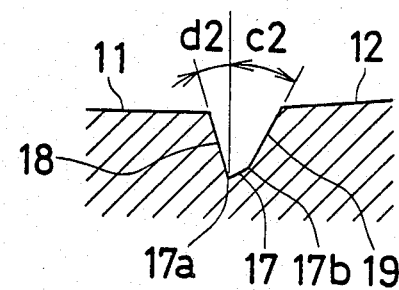
Figure 9:
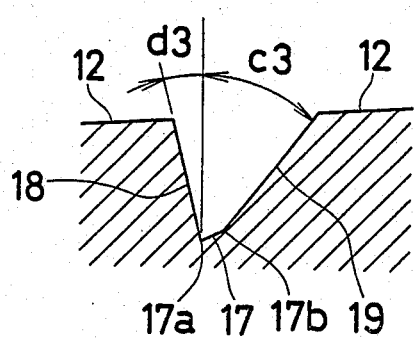
Figure 10:
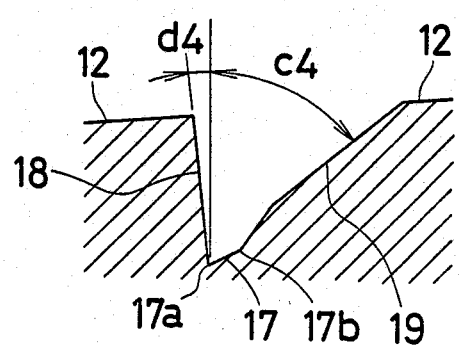

FIGS. 4 to 10 illustrate one embodiment of the thread rolling die for making the self-tapping screw according to the present invention, wherein a flat face 11 is formed on the upper part of said die and a bank part 14 equipped with an inclined face or section 12 possessing about a 20° of gimlet angle (a) and a top section 13 is extrusively formed on the lower part thereof. A plurality majority of wedge-shaped grooves shaping a single threaded screw thread 15, which are arranged in parallel with each other at the a predetermined lead angle (b), are provided on the flat face 11 in a curving manner, gradually reducing their depth and width as they approach their end portion. On the other hand, the first and second grooves shaping the cutting screw thread 16 and 16' for rolling double threaded cutting screw thread which is referred to below are juxtaposed in groups on the lower part of the die such that they are in parallel with each other as well as being equally spaced. This groove shaping cutting screw thread 16 is equipped with a face shaping the cutting flank 18 on one part and a face shaping the resistance flank 19 on another part with the bottom of the groove 17 interposed therebetween. The bottom of the groove 17 possesses a small width, is slightly inclined (see FIGS. 7 to 10), and possesses an inclined lower side 17a and an inclined upper side 17b which are connected to the face shaping the cutting flank 18 and the face shaping the resistance flank 19, respectively.

After said groove shaping the cutting screw thread 16 makes access from the above-mentioned flat face 11 near the center of the inclined face 12, while said groove 16 is located at the position between the part deeper than the position of the flat face 11 and the part more shallow than the position of the groove shaping the single threaded screw thread 15, said groove 16 commences to make an ascent and, upon completion of reaching the top section 13 of the bank part 14, it reduces its depth to zero. The width and depth of the groove shaping the cutting screw thread 16 become smaller at the beginning part 20 thereof. Furthermore, the face shaping the resistance flank 19 along the groove shaping said cutting screw thread 16 accompanies its progress to the vicinity where the above-mentioned groove shaping the cutting screw thread 16 commences to make an ascent with a gradually more reduced slant. Namely, as shown in FIGS. 7 to 10, on the cross section perpendicular to the line traced along the bottom 17 of the groove shaping the cutting screw thread 16, the angle (hereafter called the included angle) formed between the virtual line perpendicular to the bottom 17 of a groove shaping the cutting screw thread 16 and the face shaping the resistance flank 19 is gradually increased to read 25° for (c1) in FIG. 7, 30° for (c2) in FIG. 8, 40° for (c3) in FIG. 9, and 50° for (c4) in FIG. 10, whereas the angle formed between a virtual line perpendicular to the bottom 17 and the face shaping the cutting flank 18 is gradually decreased to read 20° for (d1), 20° for (d2) in FIG. 8, 13° for (d3) in FIG. 9, and 7° for (d4) in FIG. 10. However this angle is permitted to be constant at about 15° without being always needed to be changed in such a manner. This results in gradually increasing the width of the groove shaping the cutting screw thread in proportion to its progress to the vicinity where the above-mentioned cutting screw thread commences to make an ascent and subsequently substantially increasing the width in comparison with that of the groove of the conventional thread rolling die at the arrival of said groove shaping the cutting screw thread at the inclined face 12 of the bank part 14. Similarly, the area of the face shaping the resistance flank 19 becomes larger when compared with that of the conventional thread rolling die.

Referring now to FIGS. 11 to 17, the embodiment of the self-tapping screw which is made by the above-mentioned thread rolling die may now be described. The screw is equipped with a dished head 21 and a shank 22. A a cross-shaped groove 23, capable of receiving a fastening tool such as a driver, is provided on the upper surface of said head 21. The shank 22 comprises a main section 24 possessing a root diameter of uniformity and a tapered section 25 which gradually decreases its root diameter in proportion to its progress toward the top end. The tapering angle (e) of said tapered section 25 doubling the gimlet angle (a) of the die.

The double threaded cutting screw threads 26 and 26' performing the cutting function are formed symmetrically with regard to the core of the shank as a center such that they extended one-half way around the shank on the top end side of said shank 22, whereas the single threaded screw thread 27 performing the tapping function and the fastening function is formed in a spiral manner on the base end side of said shank 22. The cutting screw threads 26 and 26' contain cutting flanks 29 and 29' disposed on the side of the turning direction and the resistance flanks 30 and 30' provided on the side opposite to the turning direction contain tops 28 and 28' of the crest interposed between these two kinds of flanks. The cutting screw threads 26 and 26' are formed from the main section 24 of the shank 22 to the tapered section 25 and the beginning portion 31 contacts the single threaded screw thread 27.

The external diameter (1) of said cutting screw threads 26 and 26' is larger than the root diameter (m) of the main section, when the former diameter is measured on the main section 24, and the diameter located on the tapered section 25 is not yet considered. For this reason, the height of the crest of the cutting screw threads 26 and 26' is increased by an amount which corresponds to the decrease in the root diameter of the tapered section 25. The external diameter thereof located on the shoulders 32 and 32' which is positioned on the middle of the tapered section is abruptly decreased, and when it reaches the top end 33 of the tapered section, the external diameter of the cutting screw thread and the height of the crest thereof are reduced to zero, whereby the screw threads 26 and 26' are eliminated.

Because the above-mentioned cutting screw threads 26 and 26', which are formed by the grooves shaping the cutting screw thread 16 and 16' of the thread rolling die of the present invention, are formed on the tapered section, the root diameter is gradually decreased, by rolling and their height become considerably larger near to their shoulders 32 and 32'. The actual machining result does not give rise to the shape of the cutting screw threads 26 and 26' quite identically to the shape of the grooves shaping the cutting screw threads 16 and 16', but, due to deformation applied to the screw thread at the thread rolling, as shown in FIGS. 14 to 17, the cutting flanks 30 and 30', their surface being curved, are coiled around the tapered section 25 and the disconnecting flanks 29 and 29', producing an adequate rake angle, are also coiled around the tapered section 25.

Figure 11:
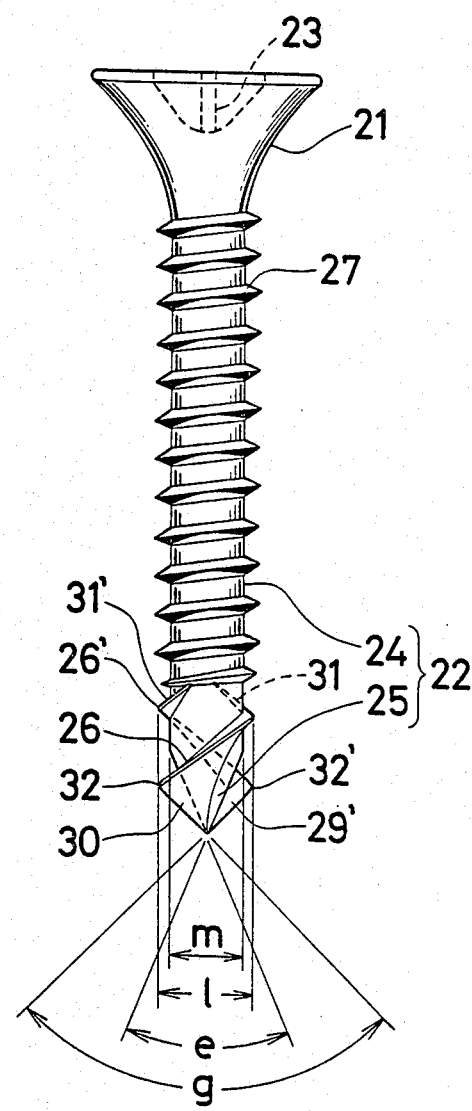
Figure 12:
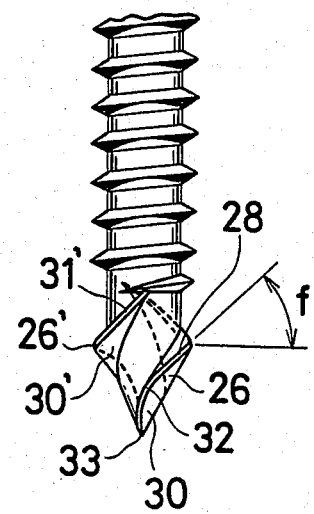
Figure 13:
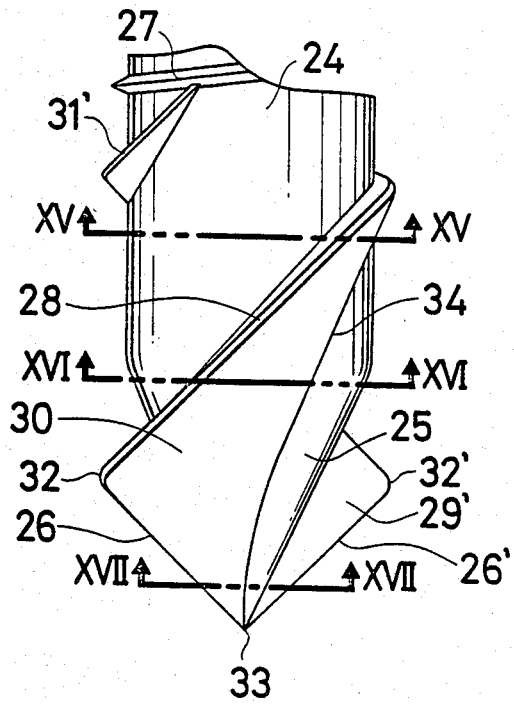
Figure 14:
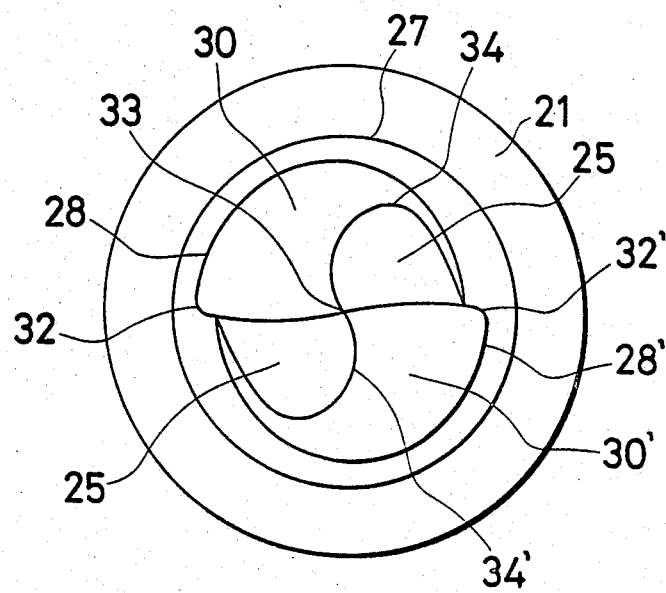

Thus, as shown in FIG. 12, the lines traced along the tops 28 and 28' of the crests of said cutting screw threads 26 and 26' become spiral possessing 40° lead angle (f), so far as their extension ranging from the beginning ends 31 and 31' of the cutting screw to the shoulders 32 and 32' thereof may be concerned, and, if a focus is shifted to their extension ranging from the shoulders 32 and 32' to the top tapered end 33, they become curved lines of arch-shaped which are formed along the plane including the core of the screw's shank. Furthermore, as shown in FIG. 11, the top end angle (g) formed by means of the shoulders 32 and 32' at the top end of the taper is set to be approximately 90°.

Figure 15:
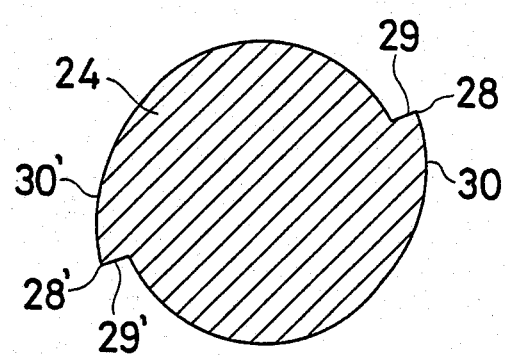
Figure 17:
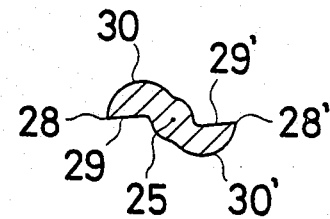
Figure 16:
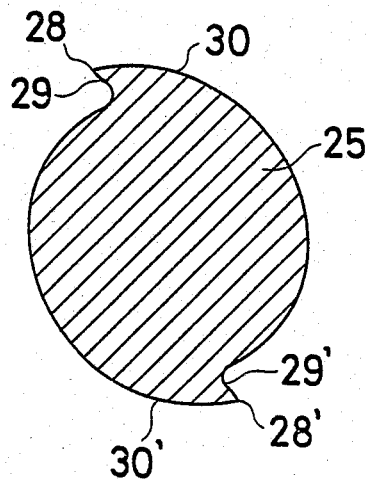

On the other hand, the lines traced along the boundaries 34 and 34' between the resistance flanks 30 and 30' of said cutting screw threads 26 and 26' and the shank 22 respectively advance more abruptly toward the top end direction of the screw as compared with the above-mentioned lines traced along the tops 28 and 28' of the crests, with their progress from the beginning ends 31 and 31' of the cutting screw thread near to the shoulders 32 and 32'. That may be caused by the arrangement in which the included angle formed by the face shaping the resistance flank 19 of the groove shaping the cutting screw 16 of the above-mentioned thread rolling die is gradually changed and, as compared with the cutting screw thread rolled by the conventional rolling die maintaining said angle to be constant, the lines 34 and 34' traced along the above-mentioned boundaries advance more abruptly toward the top end direction of the screw. Furthermore, the change in the included angle of the face shaping the resistance flank 19 of the thread rolling die brings forth a favorable result to the so-called relieving of the resistance flank. Namely, on the cross section perpendicular to the core of the screw's shank, as shown in FIGS. 15 to 17, the resistance flank 30 has no extrusion from the top 28 of the crest and gradually goes near the main section 24 of the shank 22 or the tapered section 25; as shown in FIG. 5, since the included angles (c1–c4) of the face shaping the resistance flank 19 on the cross section perpendicular to the virtual right line drawn toward the bottom 17 of the above-mentioned groove shaping the cutting screw thread 16 become larger and decrease their inclination with the progress toward the top end direction of the screw, said included angle on each point of the virtual line perpendicular to the core direction of the shank becomes larger with its going near the bottom 17 of the groove, (for example, taken on the line h—h of FIG. 5, the angle measured near the bottom 17 of the groove makes access to 50° at which the inclinating angle (c4) settles, while the angle measured near the upper part of the groove approaches 40° at which the inclinating angle settles,) resulting in the probability of favorable relieving of the resistance flank 30 of the cutting screw thread 26 which is made by said groove shaping the cutting screw thread 16 on the cross sectional plane perpendicular to the direction of the shank's core, even if the above-mentioned curving deformation caused by the rolling is taken for account.

As stated above, the bottom 17 of said groove shaping cutting screw thread 16 has a small width, being slightly inclined and such a width appears as that of the top 28 of the crest of the cutting screw thread 26. The inclinating angle, if decreased, makes the width of the top of the crest similar to the margin width of a twist drill, whereas, if increased, such an angle adapts the width of the top thereof to be united with the resistance flank so that only the uppermost edge of the top of the crest is extruded and can undergo the favorable relieving similarly to the resistance flank.

Figure 18:
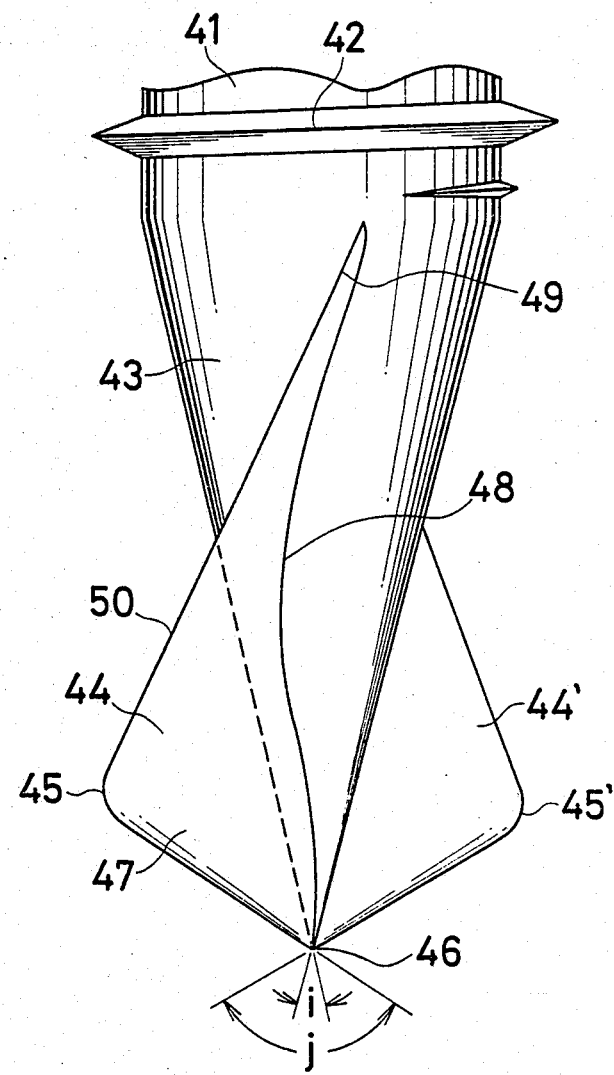
Figure 19:
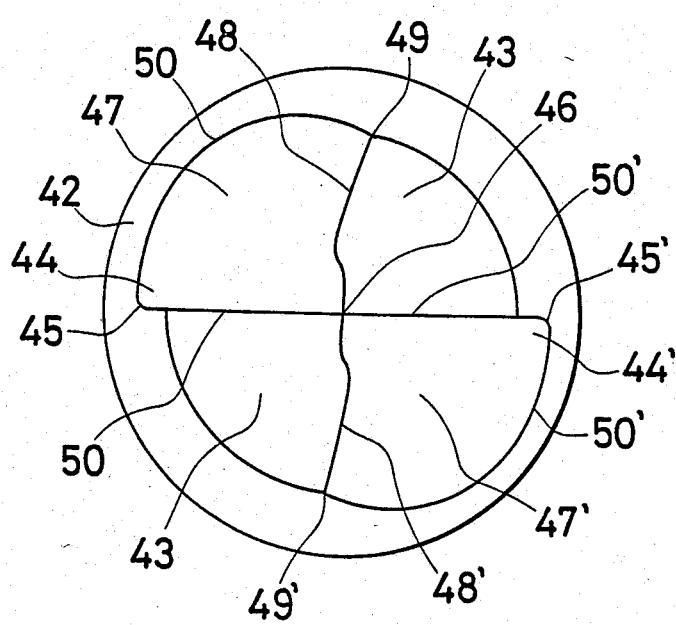
Figure 21:
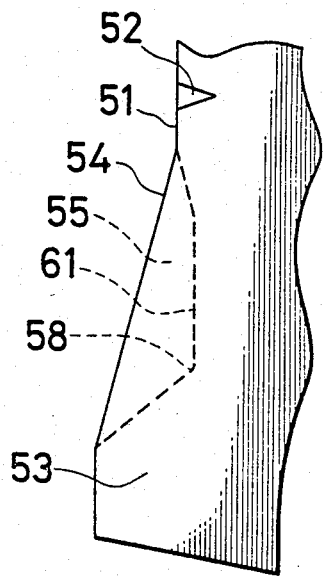
Figure 20:
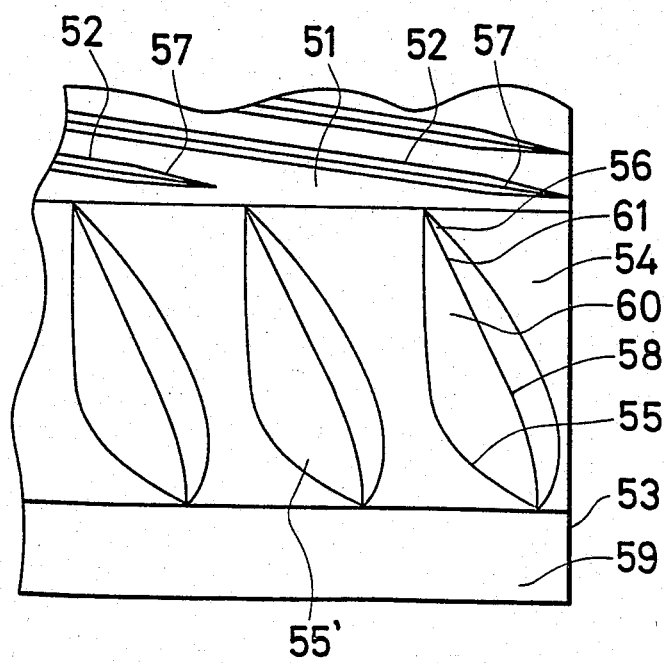
Figure 22:
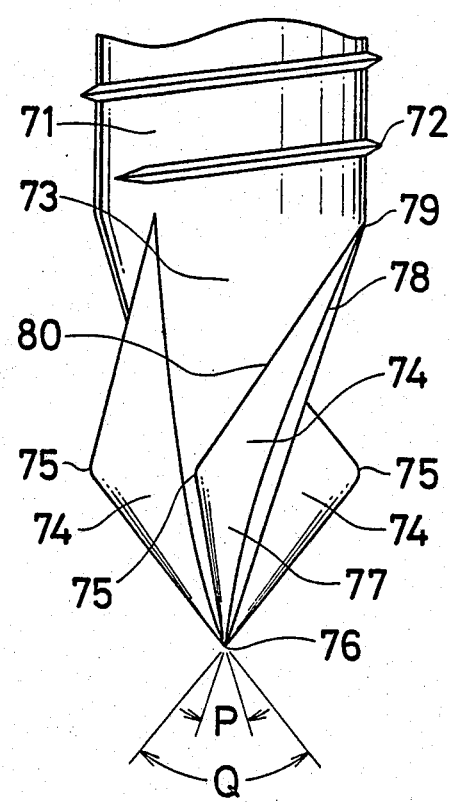
FIG. 22 is an enlarged front view illustrating the top end section of the self-tapping screw of still another embodiment.
Figure 23:
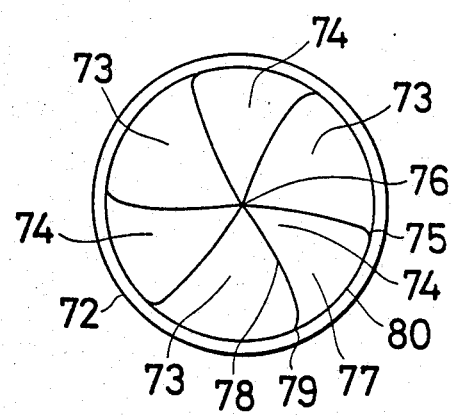
FIG. 23 is an enlarged bottom view of the same screw.
Figure 24:
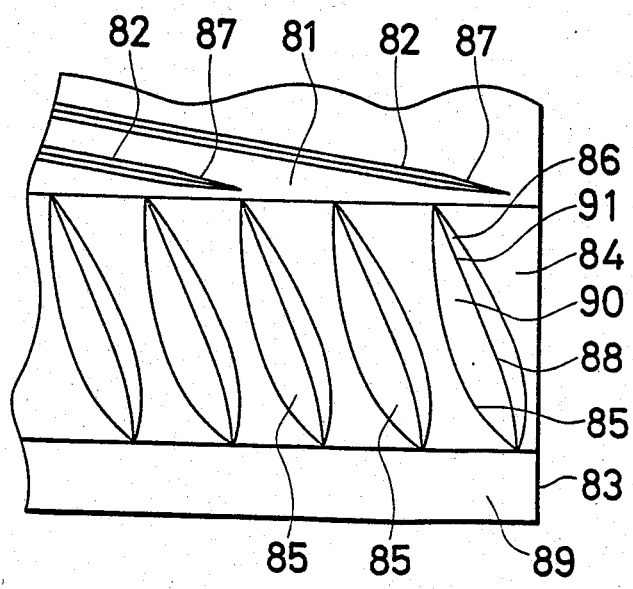
FIG. 24 is a partially enlarged front view of the thread rolling die for the same screw.
Figure 25:
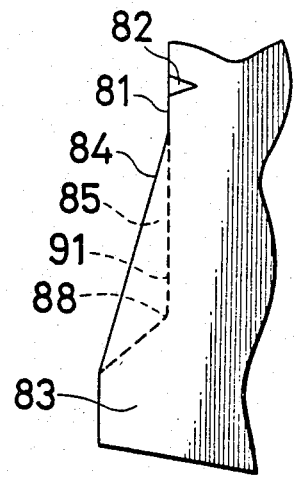
FIG. 25 is a partially enlarged side view of the same die.

Next, the description of the self-tapping screw and thread rolling die for the same according to another embodiment may be made as follows on the basis of FIGS. 18 to 20.

This self-tapping screw provides the section proper 41 of the shank, which possesses uniform root diameter, with the single threaded screw thread 42 and provides the tapered section 43 with the double threaded cutting screw threads 44 and 44' performing the cutting function such that they go ¼ around the shank. Other structure is substantially identical to the first embodiment, commencing to decrease the external diameter of the cutting screw threads 44 and 44' on the shoulders 45 and 45' and reducing the same to nil on the top end 46 of the taper. The tapering angle (i) of the tapered section 43 is approximately 30° and the top end angle (j) between the shoulders 45 and 45' is approximately 118°. The external diameter of the cutting screw threads 44 and 44' on the shoulders 45 and 45' is larger than the root diameter of the section proper 41 but is smaller than the diameter of the crest of its single threaded screw thread 42. The lines traced along the boundaries 48 and 48' between the resistance flanks 47 and 47' of said cutting screw threads 44 and 44' and the shank respectively advance gradually more abruptly toward the top end direction of the screw as compared with the lines traced along the tops 50 and 50' of the crest of the cutting screw threads 44 and 44', with the progress from its beginning ends 49 and 49' near to the shoulder and the favorable relieving of the resistance flanks 47 and 47' of said cutting screw threads 44 and 44' is performed.

The thread rolling die for making this self-tapping screw is provided with a majority of wedge-shaped grooves shaping the single threaded screw thread 52, which, possessing the predetermined lead angle, are in parallel with each other, on the flat face 51 on the upper face of the die and is provided with a majority of grooves shaping the first and second cutting screw threads 55 and 55' for shaping the above-mentioned double threaded cutting screw threads 44 and 44', which are juxtaposed in parallel with each other as well as being equally spaced, on the inclinating part 54 of the bank part 53 on the lower part of the die. The begining end 56 of these grooves shaping cutting screw thread 55 and 55' is positioned slightly under the final end 57 of the above-mentioned groove shaping the single threaded screw thread 52. After said groove shaping the cutting screw thread 55 makes an advance from the vicinity of the boundary between the above-mentioned flat face 51 and the inclinating part 54 of the bank part toward the vicinity 58 of the central and lower part of said inclinating part 54, while the same groove 55 is maintained to be under the state of being deeper than the position of said flat face 51 and being more shallow than the position of the groove shaping the single threaded screw thread 52, said groove 55 commences to make an ascent and, upon completion of reaching the top 59 of the bank part 53, its depth is reduced to nil, becoming void. Similarly to the above-mentioned first embodiment, the face shaping the resistance flank 60 of said groove shaping the cutting screw thread 55 gradually slackens its inclination with the progress from the begining end 56 of said groove shaping the cutting screw thread to the vicinity 58 of the central and lower part of the above-mentioned inclinating part.

The line traced along the bottom 61 of said groove shaping the cutting screw thread 55 becomes a straight line possessing approximately constant lead angle, so far as its extention ranging from the begining end 56 of the groove to the vicinity 58 of the central and lower part of inclination thereof may be concerned, and, if a focus is shifted to its extention ranging from the vicinity 58 of the central and lower part of said inclinating face to the top 59 of the bank part, it becomes a curved line of arch-shape which gradually increases said lead angle. As a result, the line traced along the tops 50 and 50' of the crests of the cutting screw threads 44 and 44' which range from the shoulders 45 and 45' of the above-mentioned self-tapping screw to the top end 46 of taper becomes approximately a straight line.

Next, the description of the self-tapping screw and the thread rolling die for the same of still another embodiment may be made as follows on the basis of FIGS. 22 to 25.

This self-tapping screw provides the section proper 71 possessing the uniform root diameter of the shank with the single threaded screw thread 72 and provides the tapered section 73 with the triple threaded screw threads 74, 74 and 74, performing the cutting function, which go ⅔ around the shank. Other formation may be substantially identical to that of the first embodiment and the cutting screw threads 74, 74 and 74 commence to decrease their external diameter on the shoulders 75, 75 and 75 thereof, reducing those diameters to nil on the top end 76 of the taper. The tapering angle (P) of the tapered section 73 is approximately 35° and the top end angle (Q) between the shoulders 75 and 75 is approximately 90°. The external diameter of the cutting screw threads 74, 74 and 74 located on the shoulders 75 and 75 is approximately equal to the root diameter of the section proper 71, but is smaller than the diameter of the crest of the single threaded screw thread 72. The line traced along the boundary between the resistance flank 77 of said cutting screw thread 74 and the shank makes gradually a more abrupt advance toward the top end of the screw, as compared with the line traced along the top 80 of the crest of the cutting screw thread 74, with the progress from the begining end 79 near to the shoulder and the favorable relieving of the resistance flank 77 of said cutting screw thread 74 is performed.

The thread rolling die for making this self-tapping screw provides the flat face 81 on its upper part with a majority of wedge-shaped grooves shaping the single threaded screw thread 82 which, possessing the predetermined lead angle, are arranged in parallel with each other, and provides the inclinating face 84 on the bank part 83 of its lower part with a majority of groove shaping the first, second, and third cutting screw threads 85, 85 and 85 for forming the above-mentioned triple threaded cutting screw threads 74, 74 and 74 such that the grooves are juxtaposed in parallel with each other as well as being equally spaced. The begining end 86 of the grooves shaping the cutting screw threads 85, 85 and 85 is located slightly under the final end 87 of the above-mentioned groove shaping the single threaded screw thread 82. After said groove shaping the cutting screw thread 85 makes an advance from the vicinity of the boundary between the above-mentioned flat face 81 and the inclined face 84 on the bank part to the vicinity 88 of the central and lower part of said inclinating face 84, while the bottom 91 of the groove 85 is maintained to be under the state of being approximately the same level as that of the above-mentioned flat face 81 and being more shallow than the bottom of the groove shaping single threaded screw thread 82, it commences to make an ascent and, upon completion of reaching the top 89 of the bank part 83, it reduces its depth, becoming void. Similarly to the above-mentioned first embodiment, with the progress which the face shaping the resistance flank 90 of said groove shaping the cutting screw thread 82 makes from the begining end 86 of said groove shaping the cutting screw thread to the vicinity of the central and lower part of the above-mentioned inclined part, said face shaping the resistance flank 90 gradually slackens its inclination.

The line traced along the bottom 91 of said groove shaping the cutting screw thread 82 becomes a straight line possessing a lead angle which is approximately constant, so far as its extention ranging from the begining end 86 of the groove to the vicinity 88 of the central and lower part of the inclinating face may be concerned and, if a focus is shifted to its extention ranging from the vicinity 88 of the central and lower part of said inclinating face to the top 89 of the bank part, it becomes a curved line of arch-shape which gradually increases said lead angle. As a result, the virtual line traced along the top 80 of the crest of the cutting screw thread 74 ranging from the shoulder 75 of the above-mentioned self-tapping screw to the top end 76 of the taper becomes approximately a straight line.

Reverting to the first embodiment for a while, the line along the bottom 17 of the groove shaping the cutting screw thread 16 of the thread rolling die becomes a straight line which possesses approximately constant lead angle, so far as its extention from the begining end 20 of the groove to the vicinity of the part where the groove shaping the cutting screw thread commences to make an ascent, and, if a focus is shifted to its extention ranging from the vicinity of th place where said groove shaping the cutting screw thread commences to make an ascent to the top 13 of the bank part, it becomes a straight line possessing a lead angle slightly larger than the above-mentioned lead angle. As a result, the lines traced along the tops 28 and 28' of the crest of the cutting screw threads 26 and 26' of the self-tapping screw respectively become curved lines of arch-shape, so far as their extension ranging from the shoulders 32 and 32' of the cutting screw to the top 33 of the taper may be concerned. Furthermore, without being shown, it is possible to adapt the line traced along the bottom of the groove shaping the cutting screw thread of the thread rolling die to possess a uniform lead angle along its entire extention from the beginning end to the final end and the cutting screw thread of the screw made by the present die makes a spiral advance up to the top end of the taper, resulting in giving no rise to abrupt change in the angle formed by the line traced along the top of the crest of the cutting screw thread, when the same line is located on the shoulder. For this reason, any definite shoulder does not take place and while the cutting screw thread makes a spiral advance, it is decreasing its external diameter.

The foregoing formation employed by the self-tapping screw and the thread rolling die for the same according to the present invention produces the following working effect.

First of all, referring to the self-tapping screw, first, it is possible that a hole is easily tapped even on the metal plate of comparatively larger thickness by means of the cutting screw thread possessing sufficiently long external diameter.

Second, the favorable relieving the resistance flank of the cutting screw thread is performed, at the above-mentioned process of tapping hole, the resistance flank of the cutting screw threas does not get unduly in contact with the internal wall of the hole to be cut, the turning torque necessary for tapping the hole can be reduced and, at the same time, the unreasonable contact of the resistance flank against the internal wall of the hole is prevented from giving birth to frictional heat so that the wear of the cutting screw thread can be prevented.

Third, since the resistance flank of the cutting screw thread becomes wider as compared with that of the conventional self-tapping screw, said resistance flank can sufficiently stand the turning torque produced by the process of making the hole.

Next, referring to the thread rolling die, first, since the cutting screw thread is rolled by the same die as used for rolling other screw threads, a simplification of the working processes can be executed.

Second, since a change is given to the inclination of the face shaping the resistance flank of the groove shaping the cutting screw thread, the cutting screw thread possessing the resistance flank which undergoes the favorable relieving can be formed and, at the same time, the cutting screw thread possessing the resistance flank which is wider than that of the conventional self-tapping screw can be formed on the top end of the screw.

The present invention, which is not limited to the above-mentioned embodiments, may be deformed within the gist set forth in the appendixed claims; for example, the single threaded screw thread, which is formed on the base end side of the shank under the above-mentioned embodiment, may be replaced with double threaded screw thread.

It is also possible that there takes place a continuity from the final end of the screw thread formed on the base end side of the shank to the begining end of the cutting screw thread or that the begining end of the cutting screw thread is located slightly over (on the base end side of) said screw thread.

Furthermore, on the cross sectional plane perpendicular to the line traced along the bottom of the groove shaping the cutting screw thread of the thread rolling die, the included angle of the face shaping the resistance flank gradually becomes larger with its progress from the begining end of the groove shaping the cutting screw thread to the vicinity of the place where the groove shaping the cutting screw thread commences to make an ascent. In that case all the requirements are only to adapt said included angle to become gradually larger without need of changing the same, so far as the short distance is concerned. As a result, the line traced along the boundary between the resistance flank of said cutting screw thread and the shank, which in principle makes gradually a more abrupt advance toward the top end of the screw as compared with the line traced along the top of said cutting screw thread, may make an advance in parallel with the latter line, so far as the short distance is concerned.

What is claimed is:

1. A thread rolling die for making a self-tapping screw having at least one screw thread and cutting screw thread, said cutting screw thread having a different configuration than said screw thread and located at the tapered section of said self-taping screw, said die comprising
    an upper part having a screw shaping section for rolling at least one uniform screw thread,
    said screw shaping section including a plurality of wedge-shaped grooves, for shaping said screw thread, juxtaposed on a face of the die,
    a lower part on said face of the die continuous with said screw shaping section,
    a machining section located within said lower part,
    a bank part including a top section, said top section being elevated relative to said die face and having an inclined face joining said top section to said die face, said inclined face provided for working a tapered section of the screw's top end, said bank part being provided on said machining section,
    a plurality of grooves different than said wedge-shaped grooves of the screw shaping section for shaping the cutting screw thread are juxtaposed on said machining section within said inclined face,
    said cutting screw thread shaping grooves each having a bottom with a beginning end positioned below said face of said die, said bottom changes direction toward said top section of said bank part where the depth of said cutting screw thread shaping grooves becomes zero,
    said grooves shaping the cutting screw thread each having a face for shaping a resistance flank of said cutting screw thread, and
    an included angle of said resistance flank shaping face taken on cross sectional planes perpendicular to a virtual line traced along said bottom becomes gradually larger from said beginning end of said groove shaping the cutting screw thread to about where said bottom changes direction.

2. A thread rolling die for making the self-tapping screw as defined in claim 1 characterized such that said machining section includes a flat face, said inclined face of said bank part is continuous with said flat face and each of said grooves shaping the cutting screw thread is formed from said flat face to said inclined face.

3. A thread rolling die for making the self-tapping screw as defined in claim 1, characterized such that each of said grooves shaping the cutting screw thread is formed only witin said inclined face.

4. A thread rolling die for making the self-tapping screw as defined in claim 1, characterized such that the position of said bottom of said groove shaping the cutting screw thread is below that of a flat face of said machining section before said bottom changes direction.

5. A thread rolling die for making the self-tapping screw as defined in claim 2, characterized such that the position of said bottom of said groove shaping the cutting screw thread is below that of said flat face of said machining section before said bottom changes direction.

6. A thread rolling die for making the self-tapping screw as defined in claim 3, characterized such that the position of said bottom of said groove shaping the cutting screw thread is below that of a flat face of said machining section before said bottom changes direction.

7. A thread rolling die for making the self-tapping screw as defined in claim 1, characterized such that a line traced along said bottom of said groove shaping the cutting screw thread has a lead angle which is approximately constant, until said bottom changes direction, and thereafter the lead angle is larger than the former lead angle.

8. A thread rolling die for making the self-tapping screw as defined in claim 2, characterized such that a line traced along said bottom of said groove shaping the cutting screw thread has a lead angle which is approximately constant, until said bottom changes direction, and thereafter the lead angle is larger than for former lead angle.

9. A thread rolling die for making the self-tapping screw as defined in claim 3, characterized such that a line traced along said bottom of said groove shaping the cutting screw thread has a lead angle which is approximately constant, until said bottom changes direction and thereafter the lead angle is larger than the former lead angle.

10. A thread rolling die for making the self-tapping screw as defined in claim 4, characterized such that a line traced along said bottom of said groove shaping the cutting screw thread has a lead angle which is approximately constant, until said bottom changes direction and thereafter the lead angle is larger than the former lead angle.

11. A thread rolling die for making the self-tapping screw as defined in claim 1, characterized such at a line traced along said bottom of said groove shaping the cutting screw thread has a lead angle which is approximately constant, until said bottom changes direction and thereafter the line has an arch-shape, with a lead angle which becomes gradually larger than the former lead angle.

12. A thread rolling die for making the self-tapping screw as defined in claim 2, characterized such that a line traced along said bottom of said groove shaping the cutting screw thread has a lead angle which is approximately constant, until said bottom changes direction, and thereafter the line is a curved line, of an arch-shape, with a lead angle which becomes gradually larger than the former lead angle.

13. A thread rolling die for making the self-tapping screw as defined in claim 3, characterized such that a line traced along said bottom of said groove shaping the cutting screw thread has a lead angle which is approximately constant, until said bottom changes direction, and thereafter the line is a curved line, of an arch-shape, with a lead angle which becomes gradually larger than the former lead angle.

14. A thread rolling die for making the self-tapping screw as defined in claim 4, characterized such that a line traced along said bottom of said groove shaping the cutting screw thread has a lead angle which is approximately constant, until said bottom changes direction, and thereafter the line is a curved line of an arch-shape, with a lead angle which becomes gradually larger than the former lead angle.

15. A thread rolling die for making the self-tapping screw as defined in claim 1, characterized such that a line traced along said bottom of said groove shaping the cutting screw thread had a lead angle which is approximately constant.

16. A thread rolling die for making the self-tapping screw as defined in claim 2, characterized such that a line traced along said bottom of said groove shaping the cutting screw thread has a lead angle which is approximately constant.

17. A thread rolling die for making the self-tapping screw as defined in claim 3, characterized such that a line traced along said bottom of said groove shaping the cutting screw thread has a lead angle which is approximately constant.

18. A thread rolling die for making the self-tapping screw as defined in claim 4, characterized such that a line traced along said bottom of said groove shaping the cutting screw thread has a lead angle which is approximately constant.

* * * * *